United States Patent
Louvel

(10) Patent No.: US 11,511,845 B2
(45) Date of Patent: Nov. 29, 2022

(54) EMERGENCY EXIT DOOR FOR AN AIRCRAFT CABIN, WITH OPENING ASSIST MECHANISM

(71) Applicant: LATECOERE, Toulouse Occitaine (FR)

(72) Inventor: Fabien Louvel, Mons Occitanie (FR)

(73) Assignee: LATECOERE, Toulouse (FR)

( * ) Notice: Subject to any disclaimer, the term of this patent is extended or adjusted under 35 U.S.C. 154(b) by 0 days.

(21) Appl. No.: 15/733,974

(22) PCT Filed: May 28, 2019

(86) PCT No.: PCT/EP2019/063869
§ 371 (c)(1),
(2) Date: Dec. 1, 2020

(87) PCT Pub. No.: WO2019/229083
PCT Pub. Date: Dec. 5, 2019

(65) Prior Publication Data
US 2021/0206465 A1 Jul. 8, 2021

(30) Foreign Application Priority Data
Jun. 2, 2018 (FR) ....................................... 1854806

(51) Int. Cl.
*B64C 1/14* (2006.01)

(52) U.S. Cl.
CPC ................. *B64C 1/1423* (2013.01)

(58) Field of Classification Search
CPC ..... B64C 1/1438; B64C 1/143; B64C 1/1423; E05B 1/0053; E05B 1/003; E05B 1/0092; E05B 2001/0023; E05B 5/003

USPC ....................................................... 244/129.1
See application file for complete search history.

(56) References Cited

U.S. PATENT DOCUMENTS

| 1,439,018 A | * | 12/1922 | Newcom | G05G 1/085 |
| | | | | 74/547 |
| 2,610,084 A | * | 9/1952 | Anderson | E05B 77/00 |
| | | | | 49/460 |
| 2,751,636 A | * | 6/1956 | James | B64C 1/1407 |
| | | | | 49/249 |
| 3,591,143 A | | 7/1971 | Boller | |

(Continued)

FOREIGN PATENT DOCUMENTS

EP 0592317 4/1994
EP 0876954 11/1998
(Continued)

*Primary Examiner* — Christopher D Hutchens
(74) *Attorney, Agent, or Firm* — Defillo & Associates, Inc.; Evelyn A. Defillo

(57) ABSTRACT

An emergency exit door (2) for an aircraft cabin, the door includes an opening-assist mechanism and an opening/closing device having a control lever (7), which can selectively be actuated to either unlock the door (2) and permit the action of the door (2) opening assist mechanism or to lock the door (2). The control lever (7) includes an adaptation mechanism (10) for adjusting the lever arm, the adaptation mechanism (10) being moveable between at least two positions: an opening-action position and a closing-action position, the lever arm (LO) of the control lever (7) in the opening-action position being shorter than the lever arm (LF1, LF2) of the control lever (7) in the closing-action position.

8 Claims, 4 Drawing Sheets

(56) References Cited

U.S. PATENT DOCUMENTS

| | | | | |
|---|---|---|---|---|
| 4,510,714 A * | 4/1985 | Kasper | ............... | B64C 1/1415 |
| | | | | 244/129.5 |
| 5,697,570 A * | 12/1997 | Zander | ............... | G03B 1/02 |
| | | | | 242/350 |
| 6,921,060 B2 * | 7/2005 | Weed, Jr. | ............... | B63B 21/16 |
| | | | | 254/266 |
| 7,712,393 B2 * | 5/2010 | Bertani | ............... | G05G 1/04 |
| | | | | 74/547 |
| 2003/0141415 A1 * | 7/2003 | Leclerc | ............... | B64C 1/1407 |
| | | | | 244/129.5 |
| 2004/0251454 A1 * | 12/2004 | Weed, Jr. | ............... | B63B 21/16 |
| | | | | 254/266 |
| 2018/0023328 A1 * | 1/2018 | Hutton | ............... | E05D 3/02 |
| | | | | 292/259 A |

FOREIGN PATENT DOCUMENTS

| | | |
|---|---|---|
| EP | 2460719 | 6/2012 |
| FR | 2802909 | 6/2001 |
| FR | 3018064 | 9/2015 |

\* cited by examiner

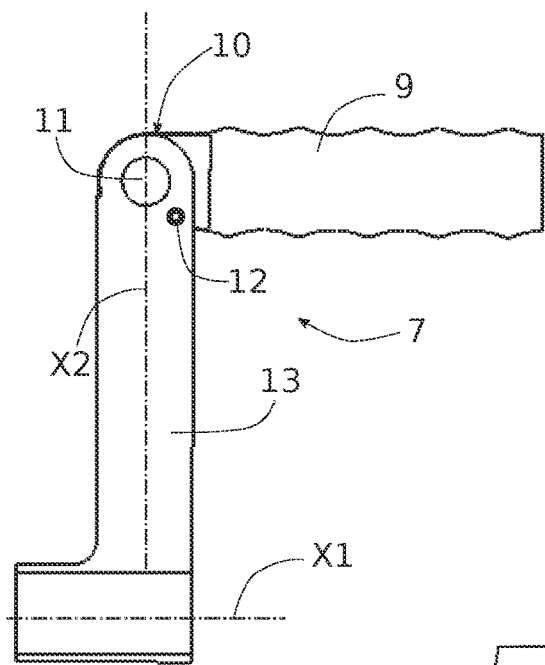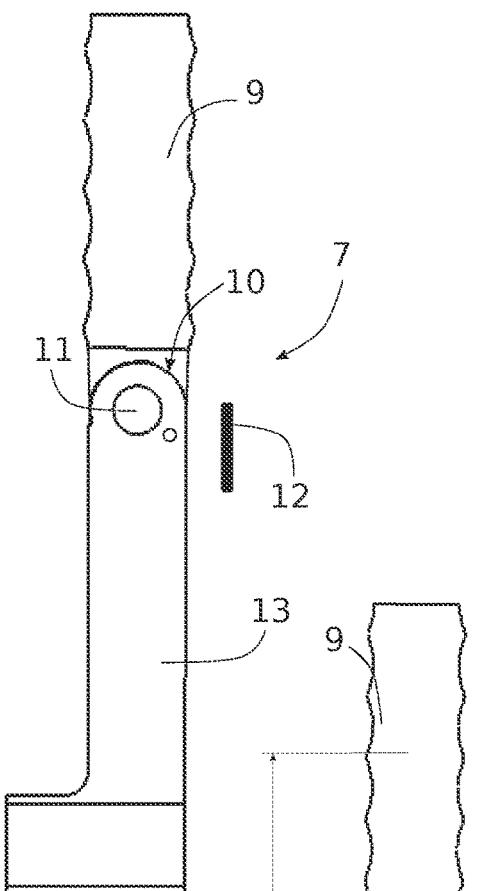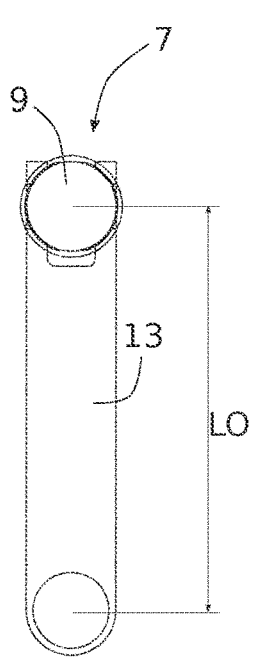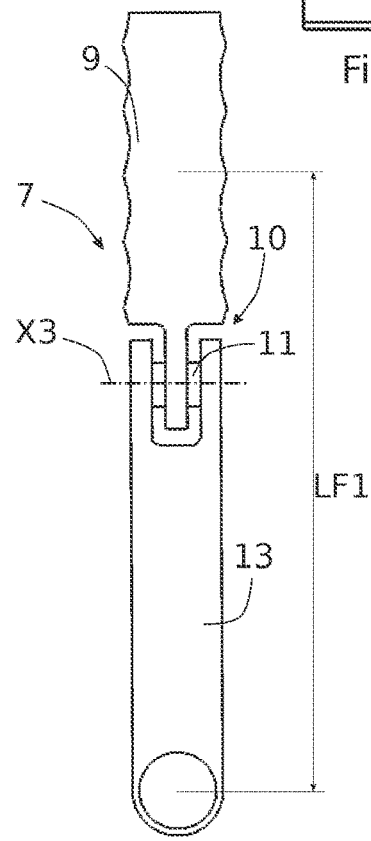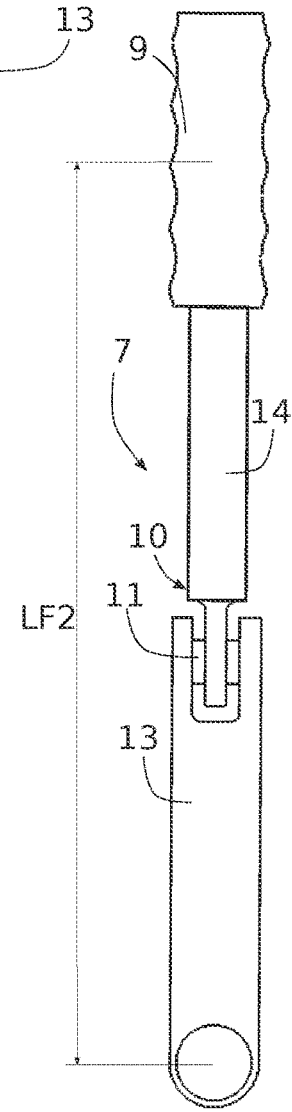
Fig. 4　Fig. 5
Fig. 6　Fig. 7　Fig. 8

EMERGENCY EXIT DOOR FOR AN AIRCRAFT CABIN, WITH OPENING ASSIST MECHANISM

CROSS REFERENCE TO RELATED APPLICATION

This application is a national stage entry of PCT/EP2019/063869 filed May 28, 2019, under the International Convention and claiming priority over French Patent Application No. 1854806 filed Jun. 2, 2018.

TECHNICAL FIELD

The invention relates to the domain of aeronautics and concerns an emergency exit door for an aircraft cabin, with opening-assist mechanism.

Aircraft, in particular airplanes, can be fitted with emergency exit doors to enable evacuation of passengers and crew in the event of emergency. Moreover, the regulations applicable to the aircraft industry often make such emergency exit doors mandatory. The design and use of such doors are strictly regulated.

Overwing emergency exit doors, which are notably present in airliners, are an example of emergency exit doors with opening-assist mechanism. These emergency exit doors are positioned above the wings of the airplane and include an opening/closing mechanism including assistance that makes opening the door easy and quick. These emergency exit doors are designed to hermetically close an opening in the fuselage of the airplane and are usually heavy and voluminous. In an emergency situation, it must be possible to open these emergency exit doors with little force required from the user, regardless of the user, and this is made possible by opening-assist means for the door.

PRIOR ART

Patent application FR3018064 describes an emergency exit door located above the wings of an airplane. This document describes a method and a device designed to open the door as quickly and easily as possible in the event of an emergency. The door opens upwards towards the outside of the airplane. An opening-assist mechanism for the door, comprising cylinders, exerts a permanent force tending to open the door to facilitate the outwards and upwards movement thereof.

Patent application EP0876954 describes another example of emergency exit doors with opening-assist mechanism for an airplane. Door opening is triggered by a lever actuated by a user. Actuators exert a permanent force on the opening mechanism of the door such that, when the user triggers opening of the door by actuating a lever, in the event of emergency, limited force is required to fully open the door. The emergency exit is then quickly ready for the evacuation, requiring limited force from the user actuating the lever.

Patent application EP0592317 also describes an example of an emergency exit door with opening-assist mechanism for an airplane.

In the aeronautics domain, and in particular in airplanes carrying passengers, the force required to open an emergency exit door should usually be less than a maximum, usually specified by aircraft manufacturers, in the region of 120 newtons, which makes the use of opening-assist means for the emergency exit door essential, in consideration of the mass of these doors and the forces required to unlock the locking elements holding the door against the fuselage.

Furthermore, these emergency exit doors have an additional function. Most aircraft undergo periodic maintenance campaigns during which the entire aircraft is handed over to maintenance teams to work on the different elements to be checked. During these maintenance operations, the emergency exit doors are opened to be inspected, and also to enable the corresponding exit to be used for equipment and maintenance staff to enter and exit the aircraft. During these maintenance operations, a maintenance operator is then required to open the emergency exit doors in the same way as a user in the event of an emergency. Maintenance staff are however also required to close these emergency exit doors once the maintenance operations have been completed.

When an emergency exit door is opened, the action is facilitated by opening-assist means, whereas, when the door is closed, the action is conversely hindered by these same opening-assist means, which are permanently active. To close the door, the user is therefore required to exert a force against the opening-assist means. The force required to close the door is greater if the opening-assist means for the door are more powerful. In other words, the more efficient the opening-assist means, the more difficult the door is to close. Effective opening-assist means ensure safety in the event of emergency, but the difficulty of closing such means hinders maintenance operations.

The difficulty in closing an emergency exit door, which arises during maintenance operations, is usually considered to be of secondary importance compared to the regulatory and safety-related importance of ensuring emergency opening requiring limited force from the user.

Since the opening performance of an emergency exit door conflicts with the ease of closing the door, aircraft in the prior art adopt a compromise that involves dimensioning the assist means as close as possible to the regulations, although these opening-assist means nonetheless make the door difficult to close during maintenance operations.

This compromise, which tends to enable neither efficient opening nor easy closing, has major drawbacks. Firstly, the compromise requires the opening-assist means to be dimensioned according to a minimum that is intended to satisfy the regulations, without seeking to further enhance opening performance. This compromise often results in the emergency exit door being difficult to close, and as a result maintenance teams have to coordinate several people to close a door, or use means outside the aircraft such as nacelles or machines with articulated arms to close the door.

DESCRIPTION OF THE INVENTION

The invention is intended to improve the emergency exit doors of an aircraft cabin with opening-assist mechanism by proposing such a door that both improves opening performance and makes the door easier to close during maintenance operations.

For this purpose, the invention relates to an emergency exit door for an aircraft cabin, this door including an opening-assist mechanism and an opening/closing device including a control lever that can be actuated selectively firstly to unlock the door and enable the opening-assist mechanism of the door to operate, and secondly to lock the door. The control lever includes an adaptation mechanism for the lever arm thereof, this adaptation mechanism being moveable between at least two positions: an opening-action position and a closing-action position, the lever arm of the control lever in the opening-action position being shorter than the lever arm of the control lever in the closing-action position.

Another objective of the invention relates to a method for actuating an emergency exit door for an aircraft cabin as described above, this method including the following steps:

with the control lever in opening mode in which the adaptation mechanism is in the opening-action position, opening the door by opening the control lever and allowing the opening-assist mechanism of the door to operate, moving the door against the fuselage of the aircraft, moving the adaptation mechanism to the closing-action position, thereby placing the control lever in closing mode, locking the door by closing the control lever.

Such a door usually has hinges about which the door can pivot open or closed, as well as locking means for locking the door in the closed position against the fuselage of the aircraft. In the present description and in the claims, the term "opening" means an action of the door that includes at least two operations: a door-unlocking operation, then a pivoting-open operation. Similarly, the term "closing" means an action of the door that includes at least two operations: a pivoting-closed operation, then a door-locking operation.

Such an opening/closing device makes it possible to dissociate opening performance from the ability to close the door with less force. In the opening-action position, the adaptation mechanism enables the control lever to perform an opening action requiring little force from the user, in the event of emergency, in accordance with safety requirements and regulations. The opening-assist means of the door can be dimensioned to maximize opening performance, i.e. to provide a greater force tending to open the door, since said means are relatively unaffected by the related increase in the force to be applied subsequently to re-close the door during maintenance operations. Indeed, when the adaptation mechanism is in the closing-action position, the mechanism enables the control lever to provide a supplementary force to the closing device of the door with the same force from the user, on account of the lengthening of the lever arm.

During normal operation of the aircraft, the adaptation mechanism can be kept in the opening-action position, the emergency exit door being ready to be opened in the event of an emergency. During maintenance operations, if an emergency exit door that has been opened needs to be closed, a maintenance operator can switch the adaptation mechanism to the closing-action position to benefit from a lengthening of the lever arm, thereby facilitating the closing of the door. Preferably, the lever arm of the control lever is long enough in the closing-action position to enable the door to be closed by a maintenance operator on their own without using an external machine, while providing significant opening assistance for the door, which ensures safety in the event of emergency.

Furthermore, the invention enables use of a control lever of adjustable size that is designed to be of significant size for locking (when in the closing-action position), and of smaller size for unlocking (when in the opening-action position). Indeed, once the door has been closed, the control lever should be seated behind the lining of the door, and is often level with the head of the passenger seated beside said door. The door and the upper portion thereof are therefore designed to be as small as possible, in particular avoiding projections related to the presence of the control lever, so as not to discomfort the passenger.

The aircraft door can have the following additional features, individually or in combination:

the control lever comprises a lever body and a handle, the adaptation mechanism includes a pivot enabling a rotation between the lever body and the handle, the handle being perpendicular to the lever body when the adaptation mechanism is in the closing-action position, and the handle being aligned longitudinally with the lever body when the adaptation mechanism is in the closing-action position, the adaptation mechanism includes a telescopic arm, the adaptation mechanism includes an opening-action position bolt, the door includes an opening-assist device, the opening-assist device has at least one spring pressing the door open, the door includes locking means designed to unlock the door by means of a downward movement of the door such that the opening-assist device includes the action of the weight of the door.

PRESENTATION OF THE DRAWINGS

Other features and advantages of the invention are set out in the non-limiting description below with reference to the attached drawings, in which:

FIG. 4 is a magnified view of the control lever of the opening/closing device of the door in FIG. 3, this control lever being in opening mode;

FIG. 5 shows the control lever in FIG. 4 in closing mode;

FIGS. 6 and 7 are side views of FIGS. 4 and 5 respectively;

FIG. 8 is a view similar to FIG. 7 for a variant embodiment of the control lever;

DETAILED DESCRIPTION

Figure 1:
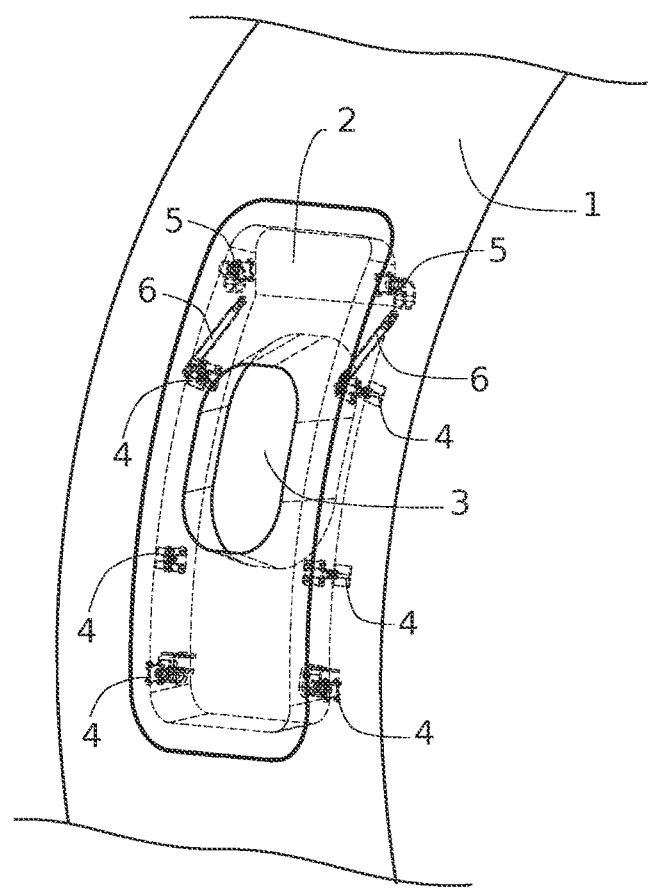
FIG. 1 is a partial perspective view of an aircraft showing an emergency exit door in closed position.
Figure 2:
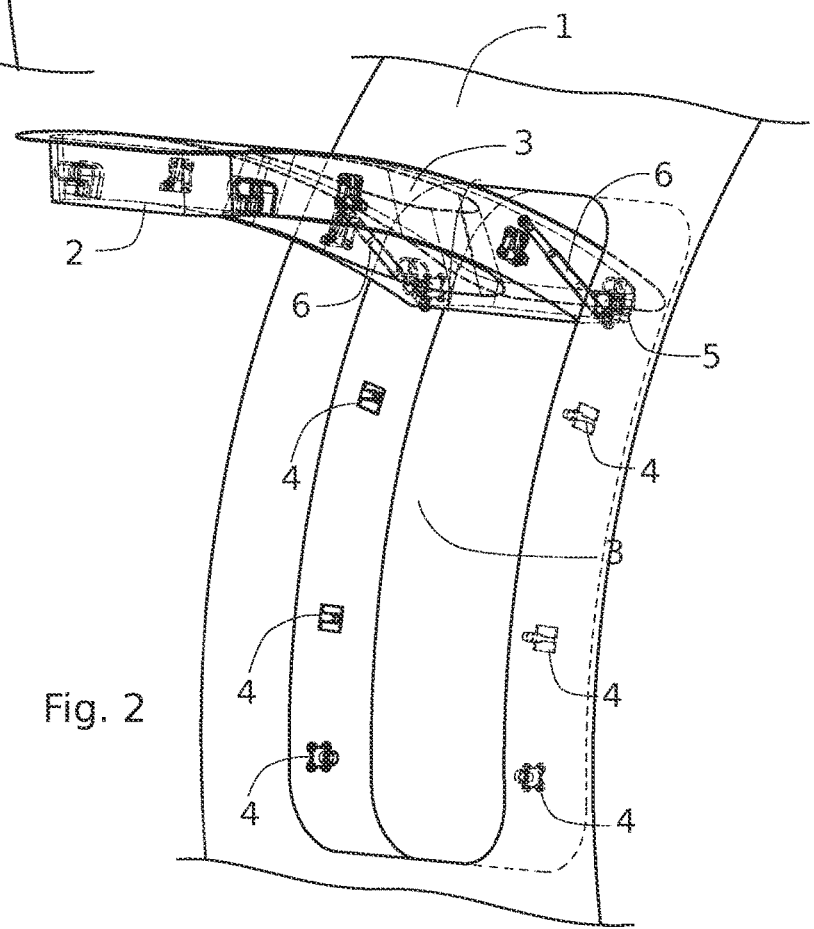
FIG. 2 shows the door in FIG. 1 in open position.

FIGS. 1 and 2 show operation of an emergency exit door with opening-assist mechanism for an aircraft cabin. These figures show a portion of the fuselage 1 of the aircraft.

FIG. 1 shows an emergency exit door 2 in this portion of the fuselage 1. The door 2 has an opening/closing device and, in the present example, a window 3.

The opening/closing device includes locking elements 4 that are formed conventionally by door stops and airplane counter-stops fastened respectively to the lateral edges of the door 2 and to the lateral edges of the door frame, on the side of the fuselage 1.

In the example described herein, cooperation between the doorstops and the aircraft counter-stops is as described in patent application FR3018064, such that the locking elements 4 enable the door 2 to be locked, after the door 2 has been pivoted closed, by means of an upward movement of the door in relation to the fuselage, and enable the door to be unlocked by means of a downward movement of the door in relation to the fuselage.

The opening/closing mechanism also includes a hinge device 5 enabling the door 2 to be pivoted open or closed in relation to the fuselage 1, enabling the door 2 to be raised or lowered in relation to the fuselage 1 to enable the door to be locked and unlocked.

The opening/closing mechanism also includes opening-assist means for the door 2. In the present example, these opening-assist means comprise:

two opening-assist cylinders 6, the weight of the door 2.

The cylinders 6 are for example gas cylinders that are mounted between the fuselage 1 and the door 2 and that are compressed when the door is in the closed position, exerting a permanent force on the door 2 when the door is in the closed position.

The closed position, shown in FIG. 1, for the door 2 is the normal position of this door 2 in which the door hermetically closes the fuselage 1, the locking elements 4 being locked and the cylinders 6 being compressed.

FIG. 2 shows the door 2 in the open position. This open position is used for emergency evacuations from the aircraft and maintenance operations. In this open position, the door 2 gives access to the inside of the fuselage 1, the locking elements 4 are unlocked and the cylinders 6 are extended and hold the door 2 open.

Between the closed position in FIG. 1 and the open position in FIG. 2, the door 2 performs an opening action including:

an unlocking operation in which a lever is actuated from the inside of the aircraft, causing the door to undergo a downward movement in relation to the fuselage, which unlocks the locking elements 4, a pivoting-open operation in which the door pivots about the hinges 5 thereof and moves to the end-of-travel position in FIG. 2.

During the unlocking operation, the weight of the door 2 and the force of the cylinders 6 assist the movement. During the pivoting-open operation, the cylinders 6 alone cause the door 2 to pivot open such that the door 2 pivots open automatically after unlocking.

Conversely, between the open position in FIG. 2 and the closed position in FIG. 1, the door 2 performs a closing action including:

a pivoting-closed operation in which the door pivots about the hinges 5 thereof and reaches an end-of-travel position against the fuselage, the locking means 4 coming into contact with one another, a locking operation in which a lever is actuated from the inside of the aircraft, causing the door to undergo an upward movement in relation to the fuselage, which locks the locking elements 4.

The pivoting-closed operation is performed against the force of the cylinders 6, but is assisted by the weight of the door 2. The locking operation is performed against the weight of the door 2 (to lift the door 2 in relation to the fuselage) and against the force of the cylinders 6.

Figure 3:
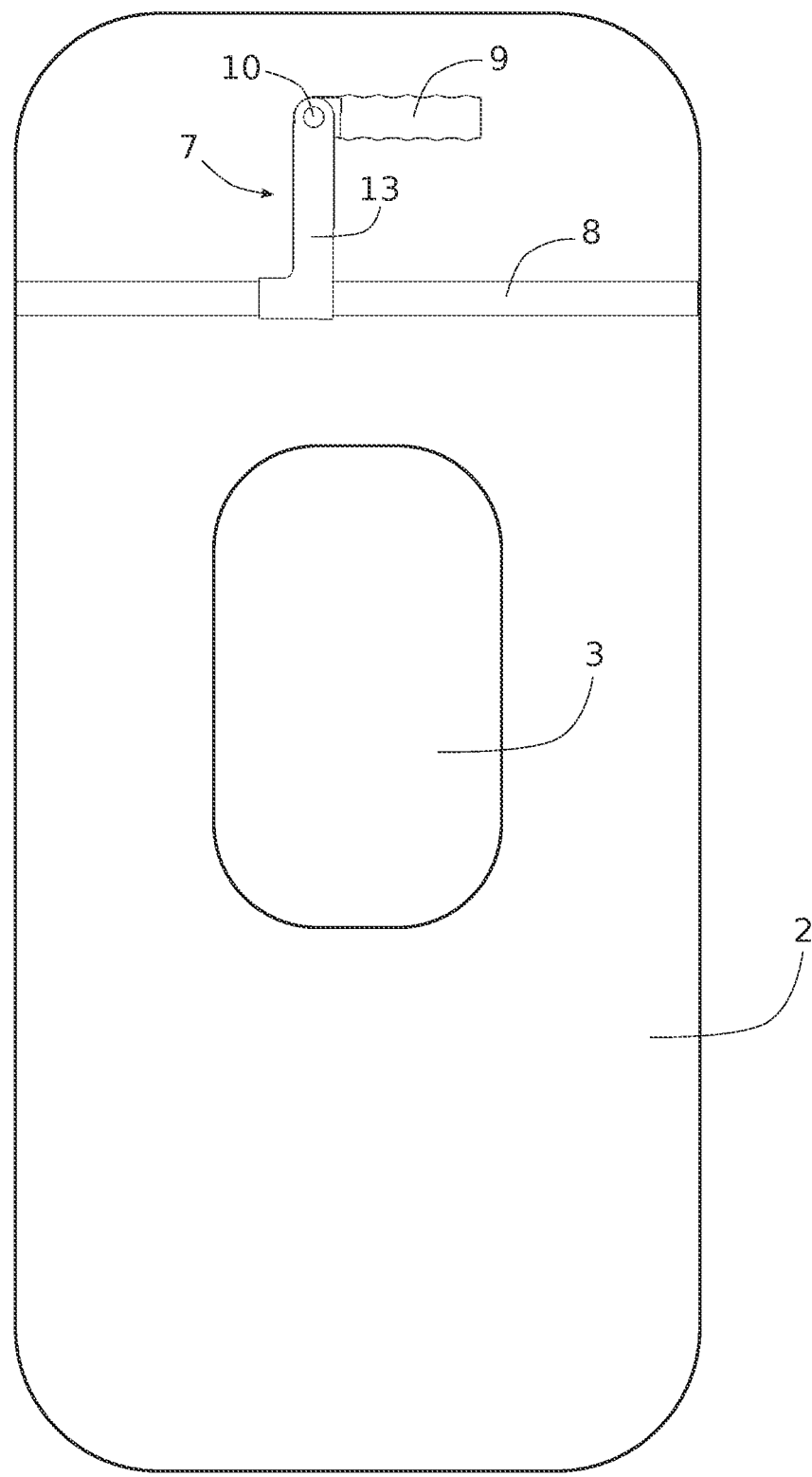
FIG. 3 is a front view of the door in FIGS. 1 and 2 from inside the aircraft.

FIG. 3 shows the door 2 from the inside of the aircraft when the door is in the closed position. This is how a user preparing to open the door sees the door 2. As user interface, the opening/closing device of the door 2 has a control lever 7 that is actuated to unlock the door and to release the opening-assist mechanism provided by the cylinders 6 and the weight of the door.

The control lever 7 is mounted on a shaft 8 that pivots about the longitudinal axis thereof. When caused to pivot by the control lever 7, the shaft 8 enables the door 2 to be lowered in relation to the fuselage and the locking elements 4 to be unlocked using a conventional mechanism (not shown) inside the door 2. The control lever 7 includes a handle 9 that is arranged, in this example, parallel to the shaft 8.

For a user facing the door 2 wishing to open the door, the action involves simply grasping the handle 9 and pulling the handle towards the user. At the beginning of the action, the user is required to exert a relatively low force to initiate unlocking of the locking elements 4. The weight of the door 2 and the force exerted by the cylinders 6 are added to the force exerted by the user and assist the user in performing the action. Once the locking elements 4 have been unlocked, the opening-assist cylinders 6 alone continue to pivot the door 2 until the door is fully open, in this case without any force being required from the user.

The control lever 7 also has an adaptation mechanism 10 that is moveable between an opening-action position and a closing-action position. When the adaptation mechanism 10 is in the opening-action position, the control lever 7 is in opening mode. When the adaptation mechanism 10 is in the closing-action position, the control lever 7 is in closing mode.

In FIG. 3, the adaptation mechanism 10 is in the opening-action position and the control lever 7 is therefore in opening mode. In normal operation, the door 2 is closed, the locking elements 4 are locked, and the control lever 7 is in the opening-action position, ready to be actuated to open in the event of emergency.

FIGS. 4 to 7 show the control lever 7 in opening mode and closing mode.

FIG. 4 shows the control lever 7 in opening mode, in the position shown in FIG. 3, i.e. in the position accessible to a user. The control lever 7 includes a body 13 on which the handle 9 is mounted by means of the adaptation mechanism 10.

In the present example, the adaptation mechanism 10 has a pivot 11, the rotation axis X3 of which is perpendicular to the rotation axis X1 of the body 13 and perpendicular to the longitudinal axis X2 along which the body 13 extends. The adaptation mechanism 10 also has a bolt, in this case comprising a pin 12, that, when in position, passes through the orifices formed in the control lever 7 and in the handle 9 such as to lock the position of the handle 9 in relation to the control lever 7 in the position shown in FIG. 4, i.e. in the position in which the handle 9 is perpendicular to the body 13.

FIG. 5 shows the control lever 7 in closing mode, i.e. when the adaptation mechanism 10 is in the closing-action position. In this mode, the pin 12 has been removed, thereby enabling rotation of the handle 9 in relation to the control lever 7, and the handle 9 has been pivoted through 90° about the pivot 11. In this opening mode, the handle 9 substantially extends the control lever 7. Optionally, the pin 12 can be repositioned to lock the handle 9 in the position shown in FIG. 5.

FIGS. 6 and 7 are right-hand views of FIGS. 4 and 5 respectively, enabling comparison of the lever arms of the control lever 7 in opening or closing mode.

In FIG. 6, the length of the lever arm LO of the control lever 7 in opening mode extends from the axis X1 to the axis X3.

In FIG. 7, the length of the lever arm LF1 of the control lever 7 in closing mode extends from the axis X1 to the middle of the handle 9. In this example, upon grasping the handle 9, the user is assumed to exert a force with an intensity positioned substantially halfway along the handle 9.

FIG. 8 shows a variant in which the adaptation mechanism 10 also has a telescopic arm 14 on which the handle 9 is mounted so that the handle can be moved away from the pivot 11. In this variant, the mechanism 10, in addition to enabling rotation of the handle 9, makes the handle telescopic, which provides a lever arm LF2 that is even longer in closing mode.

Figure 9:
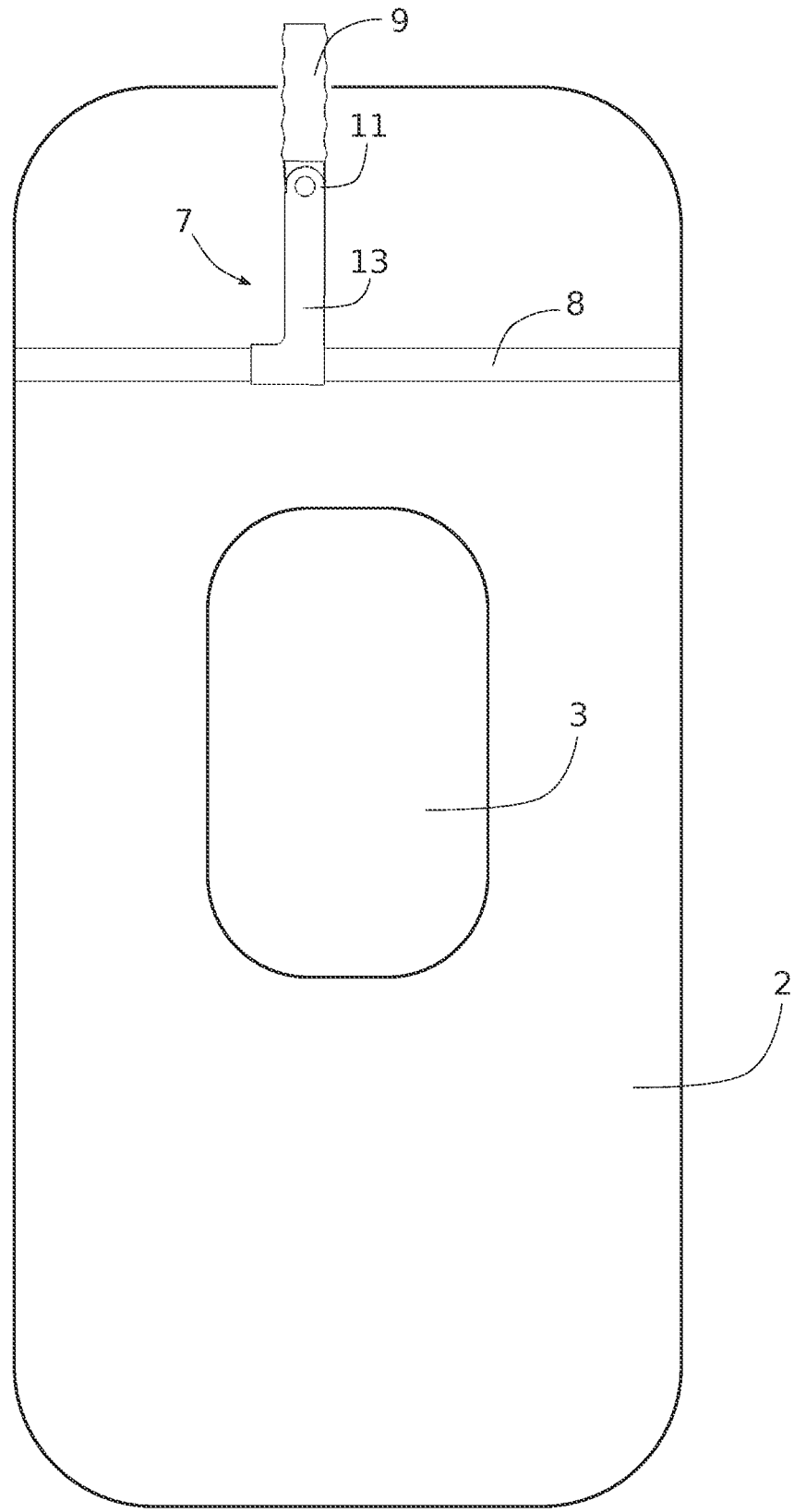
FIG. 9 is a view similar to FIG. 3, in which the control lever is in closing mode.

FIG. 9 shows the door 2 in a position similar to the position shown in FIG. 3, the control lever 7 in this case being in closing mode.

FIG. 9 shows a mode used during maintenance operations of the aircraft. After the door 2 has been opened for maintenance requirements, the door is then closed by an operator who first acts manually on the door 2 to pivot the door closed from the open position thereof (FIG. 2) to a position in which the door 2 is moved against the fuselage of the aircraft, the locking elements 4 not yet being locked. The operator then switches the adaptation mechanism 10 to the closing-action position by removing the pin 12 and pivoting the handle 9 about the pivot 11 to put the control lever 7 in closing mode. In this closing mode, the operator closes the control lever 7, in this case by pushing the lever upwards, until the locking elements 4 are locked by rotation of the pivoting shaft 8. Throughout this locking action, the operator exerts a force against the opening-assist means comprising cylinders 6 and the weight of the door 2.

In the present example, the closing mode of the control lever 7 has a lever arm LF1 that is 50% longer than the lever arm LO in opening mode. The force that the user has to exert for the locking operation is therefore reduced to ⅔ of the force required without the use of the adaptation mechanism 10.

According to the variant in FIG. 8, the lever arm LF2 in closing mode is twice the lever arm LO in opening mode. The force that the user has to exert for the locking operation is therefore reduced to half of the force required without the use of the adaptation mechanism 10.

The force that the user has to exert to lock the door 2 having been reduced as required (by dimensioning the lever arm), the cylinders 6 can be dimensioned to exert an opening-assist force increased accordingly.

Other variant embodiments of the opening/closing device for an emergency exit door with opening-assist mechanism can be implemented without thereby moving outside the scope of the invention. For example, the aircraft can be any flying machine designed to transport passengers.

The adaptation mechanism can have intermediate positions between the opening-action position and the closing-action position described herein. The bolt of the adaptation mechanism can be provided using any means, other than a pin, enabling the control lever 7 to be blocked in opening mode, and possibly in closing mode.

The adaptation mechanism can also be provided using any means enabling the lever arm of the control lever to be lengthened. The body 13 of the control lever 7 can for example be telescopic.

The opening-assist mechanism of the emergency exit door can also be provided using means other than the auxiliary cylinders 6 and the weight of the door 2 described herein. For example, the opening-assist means can be provided by the weight of the door 2 only, or by the cylinders 6 only. These cylinders are a specific type of spring and any type of spring (spiral, torsion, other) can be used to exert a force tending to open the door, along with other means for exerting an auxiliary force.

The use of the weight of the door, i.e. the force applied to the door by the weight thereof, as opening-assist means for the door can be used with a different hinge device, for example a hinge device 5 enabling the door to tilt open downwards.

The invention claimed is:

1. An emergency exit door (2) for an aircraft cabin with an opening-assist mechanism and an opening/closing device comprising:
    a control lever (7) including:
        a lever body (13) and a handle (9) to selectively unlock the door (2) enabling operation of the opening-assist mechanism of the door (2), and to lock the door (2); and
        an adaptation mechanism (10) for a lever arm, the adaptation mechanism (10) being moveable between an opening-action position and a closing-action position;
    wherein the adaptation mechanism (10) includes:
        a pivot (11) enabling a rotation between the lever body (13) and the handle (9), the handle (9) being perpendicular to the lever body (13) when the adaptation mechanism (10) is in the closing-action position, and the handle (9) being aligned longitudinally with the lever body (13) when the adaptation mechanism (10) is in the closing-action position; and,
        a telescopic arm (14), the handle (9) is mounted on the telescopic arm (14), the telescopic arm (14) moves the handle (9) away from the pivot (11) so that a length (LF2) of the lever arm in closing mode is longer than a length (LO) of the lever arm in opening mode.

2. The door as claimed in claim 1, wherein the adaptation mechanism (10) includes an opening-action position bolt (12).

3. The door as claimed in claim 1, wherein the door includes an opening-assist device (6).

4. The door as claimed in claim 3, wherein the opening-assist device has at least one spring (6) pressing the door (2) open.

5. The door as claimed in claim 3, wherein the door includes locking elements (4) located on lateral edges of the door, the locking elements (4) unlock the door (2) when the control lever is actuated, moving the door downward in relation to a fuselage of the aircraft cabin, such that the opening-assist device is also helped by the action of the weight of the door (2).

6. A method for actuating an emergency exit door for an aircraft cabin as claimed in claim 1, said method comprising the steps of:
    with the control lever (7) in opening mode in which the adaptation mechanism (10) is in the opening-action position, opening the door (2) by opening the control lever (7) and allowing the opening-assist mechanism of the door to operate,
    moving the door (2) against the fuselage (7) of the aircraft,
    moving the adaptation mechanism (10) to the closing-action position, thereby placing the control lever (7) in closing mode, and
    locking the door (2) by closing the control lever (7).

7. The door as claimed in claim 1, wherein the length (LF2) of the lever arm in closing mode is twice the length (LO) of the lever arm in opening mode.

8. The door as claimed in claim 1, wherein the lever body (13) of the control lever (7) is telescopic.

* * * * *